United States Patent
Belnap et al.

(10) Patent No.: US 7,473,287 B2
(45) Date of Patent: Jan. 6, 2009

(54) THERMALLY-STABLE POLYCRYSTALLINE DIAMOND MATERIALS AND COMPACTS

(75) Inventors: John Daniel Belnap, Pleasant Grove, UT (US); Stewart N. Middlemiss, Salt Lake City, UT (US); Anthony Griffo, The Woodlands, TX (US); Thomas W. Oldham, The Woodlands, TX (US); Kumar T. Kembaiyan, The Woodlands, TX (US)

(73) Assignee: Smith International Inc., Houston, TX (US)

( * ) Notice: Subject to any disclaimer, the term of this patent is extended or adjusted under 35 U.S.C. 154(b) by 99 days.

(21) Appl. No.: 11/005,675

(22) Filed: Dec. 6, 2004

(65) Prior Publication Data
US 2005/0230156 A1 Oct. 20, 2005

Related U.S. Application Data

(60) Provisional application No. 60/527,265, filed on Dec. 5, 2003.

(51) Int. Cl.
*B24D 3/00* (2006.01)
*B24D 11/00* (2006.01)
*E21B 10/00* (2006.01)

(52) U.S. Cl. ............................. 51/307; 51/293; 51/295; 51/309; 428/408; 428/698; 428/552; 428/553; 428/557; 428/565

(58) Field of Classification Search ................... 51/307, 51/293, 295, 309; 75/434; 419/10, 14; 428/408, 428/698, 552, 553, 557, 565
See application file for complete search history.

(56) References Cited

U.S. PATENT DOCUMENTS

| 3,136,615 A | 6/1964 | Bovenkerk |
| 3,141,746 A | 7/1964 | DeLai |

(Continued)

FOREIGN PATENT DOCUMENTS

EP 0300699 1/1989

(Continued)

OTHER PUBLICATIONS

Translation of Japanese Unexamined Patent Application No. S59-218500. "Diamond Sintering and Processing Method," Shuji Yatsu and Tetsuo Nakai, inventors; Application published Dec. 10, 1984; Applicant: Sumitomo Electric Industries Co. Ltd. Office Action by USPTO mailed Mar. 11, 2003 for related U.S. Appl. No. 10/065604.

*Primary Examiner*—Michael A Marcheschi
(74) *Attorney, Agent, or Firm*—Connolly Bove Lodge & Hutz LLP

(57) ABSTRACT

Thermally-stable polycrystalline diamond materials of this invention comprise a first phase including a plurality of bonded together diamond crystals, and a second phase including a reaction product formed between a binder/catalyst material and a material reactive with the binder/catalyst material. The reaction product is disposed within interstitial regions of the polycrystalline diamond material that exists between the bonded diamond crystals. The first and second phases are formed during a single high pressure/high temperature process condition. The reaction product has a coefficient of thermal expansion that is relatively closer to that of the bonded together diamond crystals than that of the binder/catalyst material, thereby providing an improved degree of thermal stability to the polycrystalline diamond material.

10 Claims, 5 Drawing Sheets

U.S. PATENT DOCUMENTS

| | | | |
|---|---|---|---|
| 3,233,988 | A | 2/1966 | Wentorf, Jr. |
| 3,745,623 | A | 7/1973 | Wentorf, Jr. et al. |
| 4,108,614 | A | 8/1978 | Mitchell |
| 4,151,686 | A | 5/1979 | Lee et al. |
| 4,224,380 | A | 9/1980 | Bovenkerk et al. |
| 4,255,165 | A | 3/1981 | Dennis et al. |
| 4,268,276 | A | 5/1981 | Bovenkerk |
| 4,288,248 | A | 9/1981 | Bovenkerk et al. |
| 4,303,442 | A | 12/1981 | Hara et al. |
| 4,311,490 | A | 1/1982 | Bovenkerk et al. |
| 4,373,593 | A | 2/1983 | Phaal et al. |
| 4,387,287 | A | 6/1983 | Marazzi |
| 4,412,980 | A | 11/1983 | Tsuji et al. |
| 4,481,016 | A | 11/1984 | Campbell et al. |
| 4,486,286 | A | 12/1984 | Lewin et al. |
| 4,504,519 | A | 3/1985 | Zelez |
| 4,522,633 | A | 6/1985 | Dyer |
| 4,525,179 | A | 6/1985 | Gigl |
| 4,534,773 | A | 8/1985 | Phaal et al. |
| 4,556,403 | A | 12/1985 | Almond et al. |
| 4,560,014 | A | 12/1985 | Geczy |
| 4,570,726 | A | 2/1986 | Hall |
| 4,572,722 | A | 2/1986 | Dyer |
| 4,604,106 | A | 8/1986 | Hall |
| 4,605,343 | A | 8/1986 | Hibbs, Jr. et al. |
| 4,606,738 | A | 8/1986 | Hayden |
| 4,621,031 | A | 11/1986 | Scruggs |
| 4,636,253 | A | 1/1987 | Nakai et al. |
| 4,645,977 | A | 2/1987 | Kurokawa et al. |
| 4,662,348 | A | 5/1987 | Hall et al. |
| 4,664,705 | A | 5/1987 | Horton et al. |
| 4,670,025 | A | 6/1987 | Pipkin |
| 4,707,384 | A | 11/1987 | Schachner et al. |
| 4,726,718 | A | 2/1988 | Meskin et al. |
| 4,766,040 | A | 8/1988 | Hillert et al. |
| 4,776,861 | A | 10/1988 | Frushour |
| 4,784,023 | A | 11/1988 | Dennis |
| 4,792,001 | A | 12/1988 | Zijsling |
| 4,793,828 | A | 12/1988 | Burnand |
| 4,797,241 | A | 1/1989 | Peterson et al. |
| 4,802,539 | A | 2/1989 | Hall et al. |
| 4,807,402 | A | 2/1989 | Rai |
| 4,828,582 | A | 5/1989 | Frushour |
| 4,844,185 | A | 7/1989 | Newton, Jr. et al. |
| 4,861,350 | A | 8/1989 | Phaal et al. |
| 4,871,377 | A | 10/1989 | Frushour |
| 4,899,922 | A | 2/1990 | Slutz et al. |
| 4,919,220 | A | 4/1990 | Fuller et al. |
| 4,940,180 | A | 7/1990 | Martell |
| 4,943,488 | A | 7/1990 | Sung et al. |
| 4,944,772 | A | 7/1990 | Cho |
| 4,976,324 | A | 12/1990 | Tibbitts |
| 5,011,514 | A | 4/1991 | Cho et al. |
| 5,027,912 | A | 7/1991 | Juergens |
| 5,030,276 | A | 7/1991 | Sung et al. |
| 5,032,147 | A * | 7/1991 | Frushour ............... 51/309 |
| 5,037,704 | A * | 8/1991 | Nakai et al. ............ 428/550 |
| 5,092,687 | A | 3/1992 | Hall |
| 5,116,568 | A | 5/1992 | Sung et al. |
| 5,127,923 | A | 7/1992 | Bunting et al. |
| 5,135,061 | A | 8/1992 | Newton, Jr. |
| 5,176,720 | A | 1/1993 | Martell et al. |
| 5,186,725 | A | 2/1993 | Martell et al. |
| 5,199,832 | A | 4/1993 | Meskin et al. |
| 5,205,684 | A | 4/1993 | Meskin et al. |
| 5,213,248 | A | 5/1993 | Horton et al. |
| 5,238,074 | A | 8/1993 | Tibbitts et al. |
| 5,264,283 | A | 11/1993 | Waldenstrom |
| 5,337,844 | A | 8/1994 | Tibbitts |
| 5,370,195 | A | 12/1994 | Keshavan et al. |
| 5,379,853 | A | 1/1995 | Lockwood |
| 5,439,492 | A | 8/1995 | Anthony et al. |
| 5,464,068 | A | 11/1995 | Najafi-Sani |
| 5,468,268 | A | 11/1995 | Tank et al. |
| 5,496,638 | A | 3/1996 | Waldenstrom |
| 5,505,748 | A | 4/1996 | Tank et al. |
| 5,510,193 | A | 4/1996 | Cerutti et al. |
| 5,523,121 | A | 6/1996 | Anthony et al. |
| 5,524,719 | A | 6/1996 | Dennis |
| 5,560,716 | A | 10/1996 | Tank et al. |
| 5,607,024 | A | 3/1997 | Keith et al. |
| 5,620,382 | A | 4/1997 | Cho et al. |
| 5,624,068 | A | 4/1997 | Waldenstrom et al. |
| 5,645,617 | A | 7/1997 | Frushour |
| 5,667,028 | A | 9/1997 | Truax et al. |
| 5,718,948 | A | 2/1998 | Ederyd et al. |
| 5,722,499 | A | 3/1998 | Nguyen et al. |
| 5,776,615 | A | 7/1998 | Wong et al. |
| 5,833,021 | A | 11/1998 | Mensa-Wilmot et al. |
| 5,897,942 | A | 4/1999 | Karner et al. |
| 5,954,147 | A | 9/1999 | Overstreet et al. |
| 5,979,578 | A | 11/1999 | Packer |
| 6,009,963 | A | 1/2000 | Chaves et al. |
| 6,063,333 | A | 5/2000 | Dennis |
| 6,123,612 | A | 9/2000 | Goers |
| 6,126,741 | A | 10/2000 | Jones et al. |
| 6,234,261 | B1 | 5/2001 | Evans et al. |
| 6,248,447 | B1 | 6/2001 | Griffin et al. |
| 6,269,894 | B1 | 8/2001 | Griffin |
| 6,344,149 | B1 | 2/2002 | Oles |
| 6,410,085 | B1 | 6/2002 | Griffin et al. |
| 6,435,058 | B1 | 8/2002 | Matthias et al. |
| 6,544,308 | B2 | 4/2003 | Griffin et al. |
| 6,592,985 | B2 | 7/2003 | Griffin et al. |
| 6,601,662 | B2 | 8/2003 | Matthias et al. |
| 2005/0139397 | A1 | 6/2005 | Achilles |
| 2007/0181348 | A1 | 8/2007 | Lancaster et al. |

FOREIGN PATENT DOCUMENTS

| | | |
|---|---|---|
| EP | 0329954 | 8/1993 |
| EP | 0617207 | 9/1994 |
| EP | 0585631 | 4/1997 |
| EP | 0787820 | 8/1997 |
| EP | 0500253 | 11/1997 |
| EP | 0595630 | 1/1998 |
| EP | 0612868 | 7/1998 |
| EP | 0860515 | 8/1998 |
| EP | 1 190 791 | 3/2002 |
| GB | 1349385 | 4/1974 |
| GB | 2048927 | 12/1980 |
| GB | 2268768 | 1/1994 |
| GB | 2323398 | 9/1998 |
| RU | 2034937 | 5/1995 |
| RU | 566439 | 7/2000 |
| WO | WO 93/23204 | 11/1993 |
| WO | WO 96/34131 | 10/1996 |
| WO | WO 00/28106 | 5/2000 |
| WO | WO 2004/040095 | 5/2004 |
| WO | WO 2004/106003 | 12/2004 |
| WO | WO 2004/106004 | 12/2004 |

\* cited by examiner

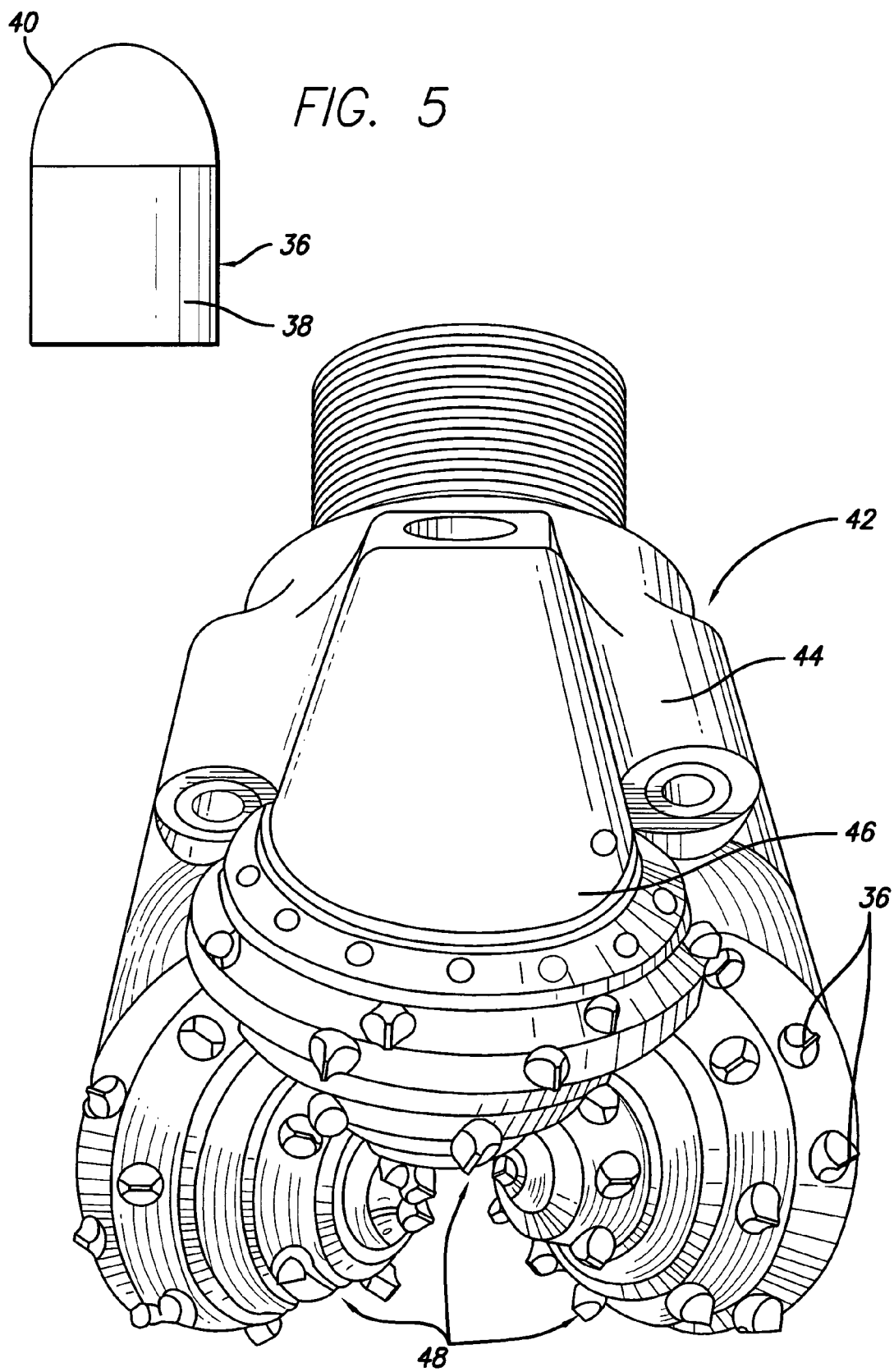

THERMALLY-STABLE POLYCRYSTALLINE DIAMOND MATERIALS AND COMPACTS

RELATION TO CO-PENDING PATENT APPLICATION

This patent application claims priority from U.S. Provisional Patent Application Ser. No. 60/527,265, which was filed on Dec. 5, 2003, and which is incorporated herein in its entirety

FIELD OF THE INVENTION

This invention generally relates to polycrystalline diamond materials and, more specifically, polycrystalline diamond materials and compacts formed therefrom that are specially designed to provide improved thermal stability when compared to conventional polycrystalline diamond materials.

BACKGROUND OF THE INVENTION

Polycrystalline diamond (PCD) materials and PCD elements formed therefrom are well known in the art. Conventionally, PCD is formed by combining diamond grains with a suitable binder/catalyst material. The mixture is subjected to conditions of extremely high temperature/high pressure, where the binder/catalyst material promotes desired intercrystalline diamond-to-diamond bonding between the grains, thereby forming a polycrystalline diamond structure. The resulting PCD structure produces enhanced properties of wear resistance and hardness, making PCD materials extremely useful in aggressive wear and cutting applications where high levels of wear resistance and hardness are desired.

Binder/catalyst materials that are typically used for forming PCD include Group VIII elements, cobalt (Co) being the most common. Conventional PCD can comprise from 85 to 95% by volume diamond and a remaining amount of the binder/catalyst material. The binder/catalyst material is present in the PCD material within interstices that exist between the bonded together diamond grains.

One problem known to exist with such conventional PCD materials is thermal degradation due to differential thermal expansion between the interstitial cobalt binder/catalyst material and the intercrystalline bonded diamond. This is known to occur at temperatures of about 400° C. Upon sufficient expansion, the diamond-to-diamond bonding may be ruptured and cracks and chips may occur.

Another problem known to exist with convention PCD materials involves the presence of the binder/catalyst material in the interstitial regions adhering to the diamond crystals, and another form of thermal degradation. This presence of the binder/catalyst material is known to catalyze phase transformations in diamond (converting to carbon monoxide, carbon dioxide, or graphite) with increasing temperature, thereby limiting practical use of the PCD material to about 750° C.

Attempts at addressing this issue are known in the art. Generally, these attempts have involved the formation of a PCD material having an improved degree of thermal stability when compared to the conventional PCD material discussed above. One known technique of producing a thermally stable PCD material involves a multi-step process of first forming a conventional sintered PCD element, i.e., one formed by combining diamond grains and a cobalt binder/catalyst material at high temperature/high pressure, and secondly selectively removing the binder/catalyst material from a working surface of the sintered element.

While this multi-step process results in the removal of the binder/catalyst from a select portion of the PCD element working surface, and is promoted as providing improved thermal stability in the region of the element where the binder/catalyst has been removed, it involves a multi-step process that is both time consuming and labor intensive.

It is, therefore, desired that a PCD material be developed that has improved thermal stability when compared to conventional PCD materials. It is also desired that such PCD material be capable of being prepared during a single manufacturing process.

SUMMARY OF THE INVENTION

Thermally-stable polycrystalline diamond materials of this invention comprise a first material phase that includes a plurality of bonded together diamond crystals, and a second material phase that includes a reaction product formed between a binder/catalyst material used to facilitate diamond crystal bonding and a material that is reactive with the binder/catalyst material. The reaction product is disposed within interstitial regions of the polycrystalline diamond material that exists between the bonded diamond crystals.

Thermally-stable polycrystalline diamond materials of this invention, comprising the above-noted two material regions, are formed during a single high pressure/high temperature process condition. Thus, the reactive material is one that is capable of forming such reactive product within the same process conditions that use used to promote bonding together of the diamond crystals. The reactive material is also one that is selected to form a reaction product having a coefficient of thermal expansion that is relatively closer to that of the bonded together diamond crystals than that of the binder/catalyst material, thereby enhancing the thermal stability of the polycrystalline diamond material. The reactive material can also be selected to form a reaction product with the diamond crystals themselves, thereby further promoting thermal stability of the resulting polycrystalline diamond material through enhanced bonding within the polycrystalline diamond microstructure.

Thermally-stable polycrystalline diamond materials of this invention are useful for forming compacts generally having the construction of a polycrystalline diamond body, including the thermally-stable polycrystalline diamond material, that is joined to a metallic substrate. When provided in the form of such a polycrystalline diamond compact, the construction can include a barrier layer interposed between the substrate and the polycrystalline diamond body to control unwanted migration of infiltration of materials from the metallic substrate to the body during high pressure/high temperature process conditions. Constructed in this manner, thermally-stable polycrystalline diamond materials of this invention are provided in a form that is useful in such wear and cutting applications as subterranean drilling, e.g., provided in the form of cutting inserts and/or shear cutters in subterranean drill bits.

BRIEF DESCRIPTION OF THE DRAWINGS

These and other features and advantages of the present invention will be appreciated as the same becomes better understood by reference to the following detailed description when considered in connection with the accompanying drawings wherein:

FIG. 5 is a perspective side view of an insert, for use in a roller cone or a hammer drill bit, comprising a thermally-stable PCD material of this invention;

FIG. 6 is a perspective side view of a roller cone drill bit comprising a number of the inserts of FIG. 5;

DETAILED DESCRIPTION

PCD materials of this invention and PCD compacts formed therefrom are specially engineered to provide improved thermal stability when compared to conventional PCD materials and are, therefore, referred to as thermally-stable PCD. Thermally-stable PCD materials of this invention are formed during a single process step of consolidating and sintering the PCD material. During this single processing step, the binder/catalyst material that is used to catalyze diamond-to-diamond intercrystalline bonding reacts with a specially selected getter material to produce a desired compound. This resulting compound has a degree of thermal stability that is greater than that of the binder/catalyst material alone, thereby contributing to the formation of a PCD element, e.g., a compact, having improved overall thermal stability when compared to conventional PCD.

Figure 1:
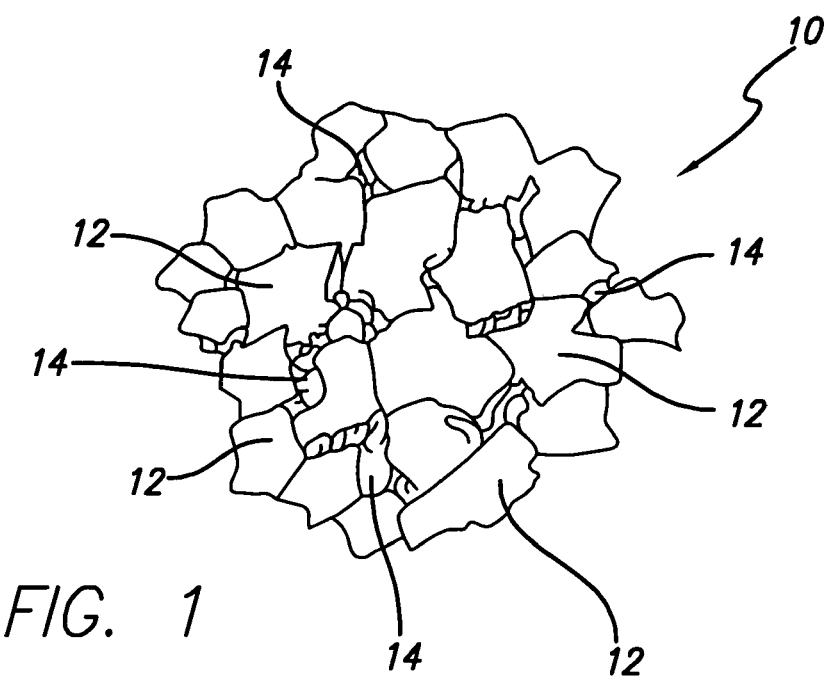
FIG. 1 is a schematic view of a thermally-stable PCD material of this invention.

FIG. 1 illustrates a first example thermally-stable PCD material embodiment 10 of this invention having a material microstructure comprising at least two material phases. A first material phase 12 comprises intercrystalline bonded diamond, and a second material phase 14 disposed interstitially between the diamond comprises a reaction product of a binder/catalyst material and a getter material.

Suitable binder/catalyst materials useful for forming thermally-stable PCD materials of this invention include those metals selected from Group VIII elements of the Periodic table, a particularly preferred binder/catalyst material being cobalt. PCD materials of this invention embodiment are prepared by combining synthetic diamond powder having an average diameter grain size in the range of from submicrometer in size to 100 micrometers, and more preferably in the range of from about 20 to 80 micrometers, with cobalt powder to provide a cobalt coating thereon. The diamond powder can contain grains having a mono or multi modal size distribution. In an example embodiment, the cobalt powder has an average grain size in the range of from about submicrometer to tens of micrometers, and more preferably in the range of 0.1 to 10 micrometers.

Another method of achieving a coating of cobalt on the diamond particles would be to coat them with a thin layer of Cobalt by some means known to the art. Various methods could be used to achieve this such as sputter coating, physical vapor deposition, chemical vapor deposition, decomposition of organo-metallic complexes, electrolytic plating, and the like. It is understood that methods not specifically listed above may be used to obtain a coating on the diamond grains.

In an example embodiment, the mixture of diamond and cobalt powder comprises in the range of from 80 to 99 percent by volume diamond, and a remaining amount cobalt, based on the total volume of the mixture. The diamond grains and cobalt powder are combined together by conventional process, such as by ball or attrittor milling for as much time as necessary to ensure good cobalt over diamond grain coverage. It is understood that during this process step some of the diamond grains may not be entirely coated with the binder/catalyst material.

A suitable binder/catalyst reaction or getter material is combined with the so-formed cobalt coated diamond grains, and the mixture is blended together by conventional method such as by ball or attrittor milling for as long as necessary to obtain good getter material coverage over or with the cobalt. Suitable getter materials useful for forming thermally-stable PCD materials of this invention include those that are capable of reacting with the binder/catalyst material during the consolidation and sintering process, e.g., at a point of the consolidating and sintering process where intercrystalline diamond bonding has started to take place. Suitable getter materials include those that react with the binder/catalyst material to form a compound having a degree of thermal stability that is greater than that of the binder/catalyst material alone, thereby contributing to the overall thermal stability of the PCD material. In forming thermally-stable PCD materials of this invention, one or a combination of getter materials can be used.

In an example embodiment, where the binder/catalyst is cobalt, a desired getter material comprises silicon or a silicon-containing compound provided in the form of a powder. Preferred silicon or silicon-containing compounds include pure silicon (Si) and silicon carbide (SiC). These getter materials can be used alone or in combination. In a preferred embodiment, a combination of silicon and silicon carbide is used. When combined with the cobalt coated diamond grains, the resulting mixture comprises diamond grains that have a sequential coating of the binder/catalyst material and the getter material.

The resulting mixture is cleaned to enhance the sinterability of the powder by treatment at high temperature in a vacuum or reducing atmosphere. The blended powder mixture is loaded into a desired container for placement within a suitable high pressure/high temperature consolidation and sintering device. The device is then activated to subject the container to a desired high pressure/high temperature condition to effect consolidation and sintering. Thermally-stable PCD materials of this invention can be consolidated and sintered by conventional equipment and techniques used to consolidate and sinter conventional PCD materials.

During the high pressure/high temperature consolidation and sintering process, the cobalt coating on the diamond grains is theorized to provide highly-localized catalysis for the rapid creation of strong bonds between the diamond grains or crystals, i.e., producing intercrystalline bonded diamond. As these bonds are formed, the cobalt moves into interstitial regions between the intercrystalline bonded diamond where it combines and reacts with the getter material, in this case Si and/or SiC. The following reactions producing cobalt disilicide ($CoSi_2$) are believed to occur:

$$Co + 2Si = CoSi_2 \qquad \text{Reaction I}$$

$$Co + 2SiC = CoSi_2 + 2C \qquad \text{Reaction II}$$

The formation of cobalt disilicide according to the above-noted reactions is a desired result because it is known to have a level of thermal stability that is superior to cobalt alone, thereby producing a PCD material having an overall corresponding improved degree of thermal stability. In the event that the getter material used is SiC, it is believed that the free carbon that is produced according to Reaction II precipitates as diamond since the reaction takes place during the high pressure/high temperature reaction in the diamond-stable region of the diamond phase diagram.

The formation and presence of this precipitated diamond in the binder phase of the PCD material microstructure is believed to have two advantages. First, it functions to enhance the overall wear and abrasion resistance of the PCD material. Second, it functions to both improve the thermal conductivity of the binder phase, and provide a coefficient of thermal expansion that is closely matched to the intercrystalline diamond bonded phase, thereby contributing to the overall thermal stability of the material.

The use of pure silicon (Si) as the getter material has the advantage that excess material, e.g., silicon, that has not reacted with cobalt is believed to form a reaction phase with the diamond crystals in the intercrystalline diamond bonded phase according to the reaction:

$$Si + C = SiC \qquad \text{Reaction III}$$

This reaction between the pure silicon and the diamond crystals is desired as it is believed to improve bonding between the binder phase and the intercrystalline diamond phase, thereby providing a PCD material having an overall improved level of structural strength between the phases.

It is to be understood that the type and amount of getter material(s) that is used can and will vary depending on the particular type and amount of binder/catalyst material that is used, in addition to the particular application for the resulting PCD compact or element that is formed from the PCD material. Additionally, as noted above, the amount of the getter materials that are used, e.g., over the stoichiometric amount, can and will vary depending on the types of reactions products that are formed. For example, as noted above, it may be desired to use a stoichiometric excess of a particular getter material to produce, in addition to a desired reaction product having an improved level of thermal stability, a desired reaction product in the binder or getter material phase of the material construction. In an example embodiment, a stoichiometric excess of up to about 50 percent may be desired, and more preferably a stoichiometric excess in the range of from about 10 to 20 percent.

It is anticipated that the molar volume changes induced during the reaction may have important effects on the final product. Since the reaction of interest is occurring within the pore spaces between diamond grains, a reaction which promotes an overall increase in molar volume will likely not proceed to completion because the volume between diamond grains is highly limited by the pressure applied by the HP/HT apparatus. Conversely, a reaction which promotes a large molar volume reduction may cause microstructural problems such as microcracking in the reacted material if the reacted volume is not large enough to fill the initial pore size. It is clear that through an engineered combination of reactants (i.e. Si and SiC) the molar volume change can be tailored over a broad range to help solve potential microstructure-related problems. Table 1 below presents reactant and product molar volume per mole Co data for reactions I and II presented above.

TABLE 1

| Reaction | Reactant Molar Volume (cc) | Product Molar Volume (cc) | Molar Volume Change (cc) | Molar Volume Change (%) |
| --- | --- | --- | --- | --- |
| (I) Co + 2Si = CoSi$_2$ | 31.1 | 21.7 | −9.4 | −30.2 |
| (II) Co + 2SiC = CoSi$_2$ + 2C | 31.7 | 28.6 | −3.1 | −9.8 |

In an example embodiment, it is desired that the types and amounts of the getter material(s) be carefully selected to enable formation of a PCD material during the consolidation and sintering process that provides a desired level of improvement in thermal stability while also not adversely affecting the sintered product, e.g., displaying minimal sintering defects such as microcracks. Ideally, the type and amount of the getter materials used to form PCD materials of this invention will be that which produces an ideal combination of optimal PCD compact physical properties and enables robust manufacturability.

Figure 2:
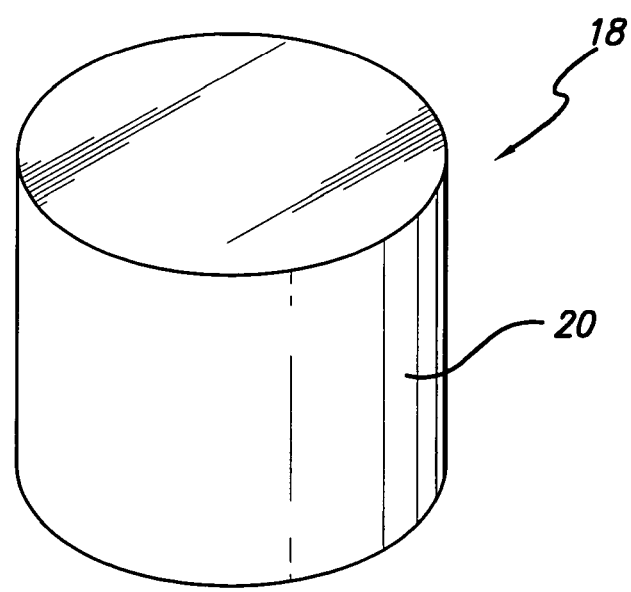
FIG. 2 is a perspective view of a PCD compact comprising a PCD body formed exclusively from the thermally stable PCD material of this invention.

It is to be understood that PCD compacts formed from PCD materials of this invention may or may not include a substrate attached thereto depending on the final intended use. FIG. 2 illustrates a PCD compact 18 formed according to this invention comprising only a PCD material body 20, i.e., without a substrate. While the PCD compact 18 is illustrated as having a certain configuration, it is to be understood that PCD compacts of this invention can be configured having a variety of different shapes and sizes depending on the particular end wear and/or cutting application.

Figure 3:
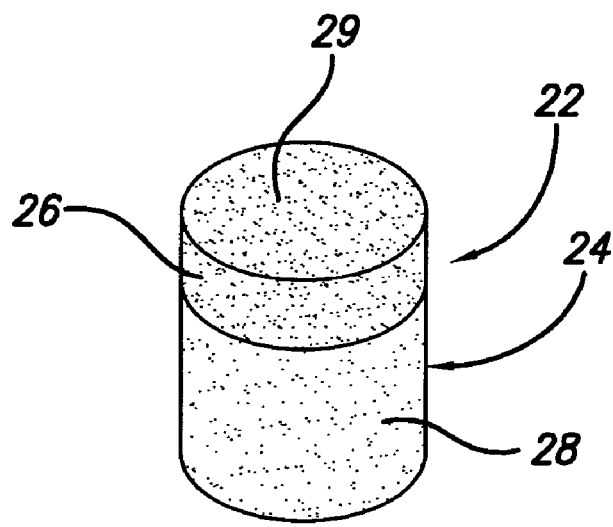
FIG. 3 is a perspective view of a PCD compact comprising a PCD body that is partially formed from the thermally-stable PCD material of this invention.

Additionally, it is to be understood that PCD compacts of this invention comprise a PCD body that is either entirely or partially formed from the PCD material of this invention. In the example embodiment illustrated in FIG. 2, the PCD compact comprises a PCD body that is made up entirely of the PCD material of this invention, i.e., comprising the reaction product of the binder/catalyst and getter material distributed throughout. Alternatively, FIG. 3 illustrates a PCD compact embodiment 22 of this invention where only a portion of the PCD body 24 is formed from the PCD material of this invention. In such embodiment, the PCD body 24 comprises a first region 26 that comprises the PCD material of this invention, and a second region 28 positioned adjacent the first region that does not. The first region can be positioned adjacent to a working surface of the PCD compact to take advantage of the improved thermal stability. The second region can comprise any type of conventional PCD material or non-PCD-containing material.

Figure 4:
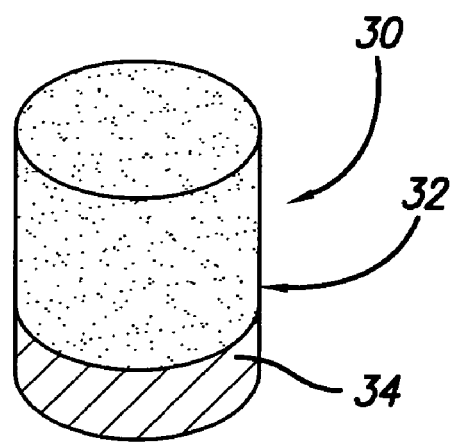
FIG. 4 is a perspective view of the PCD compact comprising a PCD body and a substrate.

FIG. 4 illustrates a PCD compact 30 of this invention comprising a PCD body 32 that is attached to a suitable substrate 34. Substrates useful for forming PCD compacts of this invention can be selected from the same general types of conventional materials used to form substrates for conventional PCD materials, including carbides, nitrides, carbonitrides, cermet materials, and mixtures thereof. In an example embodiment, the substrate can be formed from cemented tungsten carbide (WC-Co).

In the event that thermally-stable PCD compacts of this invention include a substrate formed from cemented tungsten carbide, it may be desirable to place a barrier layer between the substrate and the PCD material to prevent unwanted infiltration of extra cobalt therein which could adversely impact the thermal stability of the resultant PCD material. Such a barrier layer can be positioned between the substrate and the PCD material, or can be positioned within the PCD material a desired distance from the substrate. Materials useful for forming such a barrier layer include refractory metals that would tend to form carbides, such as Zr, Nb, Mo, Ta, as well as noble metals such as Ru, Re, Rh and Pt.

The above-identified PCD material first embodiment will be better understood with reference to the following example:

EXAMPLE 1

Thermally Stable PCD Material Formed Using a Silicon Getter Material

Synthetic diamond powder having an average grain size of approximately 20 micrometers was combined with cobalt powder having an average grain size of approximately 0.5 micrometers. The two powders were combined, and the resulting mixture had a diamond powder volume percent of approximately 95% based on the total volume of the mixture. The two powders were mixed together for a period of approximately 2-6 hours by ball milling. Powdered silicon carbide and pure silicon were each added to the mixture. Approximately 3 percent by volume of silicon carbide and 3 percent of pure silicon was added based on the total weight of the combined mixture. The mixture was then blended together for a period of 3 hours by ball milling. The resulting mixture was cleaned by heating to a temperature in excess of 850 C under vacuum and was loaded into a desired high pressure/high temperature vessel sized and shaped to provide a desired PCD compact. The vessel was subjected to a pressure of approximately 5.5 GPa and a temperature of approximately 1450 C in a vessel for a period of 0.5 hours. The vessel was opened and the PCD compact was removed.

In addition to the specific silicon getter materials discussed above, PCD materials of this invention can be prepared by using materials or elements other than silicon or silicon-containing compounds that are known to both react with the binder/catalyst material and form a compound having a level of thermal stability that is greater than that of the binder catalyst alone. It is desired that elements useful for this purpose meet the following requirements:

(a) They must form thermally stable compounds with the binder/catalyst over a wide range of stoichiometries;

(b) The reaction between the binder/catalyst and the getter element must preferably take place in the liquid phase so that the reactions proceed in a reasonable time, or solid state diffusion of the binder/catalyst in these elements must be rapid (and vice versa). Thus, the binary compound formed should have a eutectic melting temperature reasonably close to typical PCD processing temperatures;

(c) The element should not have strong solvent-catalyst effects on diamond at typical PCD reaction temperatures and pressures, and must also be a strong carbide former, so that any material that does not react with the binder/catalyst will combine with some of the diamond to provide a stable carbide phase in the matrix.

Table 2 presented below includes other suitable getter materials useful for preparing PCD materials of this invention according to the principles of this invention discussed above:

TABLE 2

| Element | Eutectic Melting Temperature(s) (° C.) | Stable Compounds Formed with Cobalt | Approximate range of binary compositions that will result in the formation of stable compounds (in at % Co) |
|---|---|---|---|
| Al | 1400 | $Al_9Co_2$, $Al_3Co_4$, $Al_5Co_2$ | 50-76 |
| B | 1090 | $BCo_2$, BCo | 18-56 |
| Be | 1120, 1200 | $BeCo$, $Be_2Co_5$ | 49-80 |
| Mo | 1340 | $MoCo_3$, $Mo_6Co_7$ | 26-46 |
| Nb | 1235 | $NbCo$, $NbCo_2$ | 27-53 |
| Si | 1402 | $SiCo_3$, $SiCo_2$, SiCo, $Si_2Co$ | 33-88 |
| Ta | 1276 | $TaCo$, $TaCo_2$ | 27-55 |
| Ti | 1025, 1135 | $TiCo_2$, TiCo, $Ti_2Co$ | 33-92 |
| V | 1240 | $VCo_3$, VCo, $V_3Co$ | 7-92 |
| Zr | 986, 1230 | $Zr_2Co$, ZrCo, $ZrCo_2$ | 33-85 |

Thermally-stable PCD materials of this invention, and compacts formed therefrom, can be used in a number of different applications, such as tools for mining, cutting, machining and construction applications, where the combined properties of thermal stability, wear and abrasion resistance are highly desired. PCD materials and compacts of this invention can be used to form working, wear and/or cutting components in machine tools and drill and mining bits such as roller cone rock bits, percussion or hammer bits, diamond bits, and shear cutters.

Referring to FIG. 5, an insert 36 for use in a wear or cutting application in a roller cone drill bit or percussion or hammer drill bit may comprise the thermally-stable PCD material of this invention. For example, such inserts can be formed from blanks comprising a substrate portion 38 formed from one or more of the substrate materials disclosed above, and a working surface 40 formed from the PCD material. The blanks are pressed or machined to the desired shape of a roller cone rock bit insert.

For example, referring to FIG. 6, wear or cutting inserts 36 (shown in FIG. 5) comprising thermally-stable PCD materials of this invention can be used with a roller cone rock bit 42 comprising a body 44 having three legs 46, and a roller cutter cone 48 mounted on a lower end of each leg. The inserts 36 can be fabricated according to one of the methods described above. The inserts 36 are provided in the surfaces of the cutter cone 48 for bearing on a rock formation being drilled.

Figure 7:
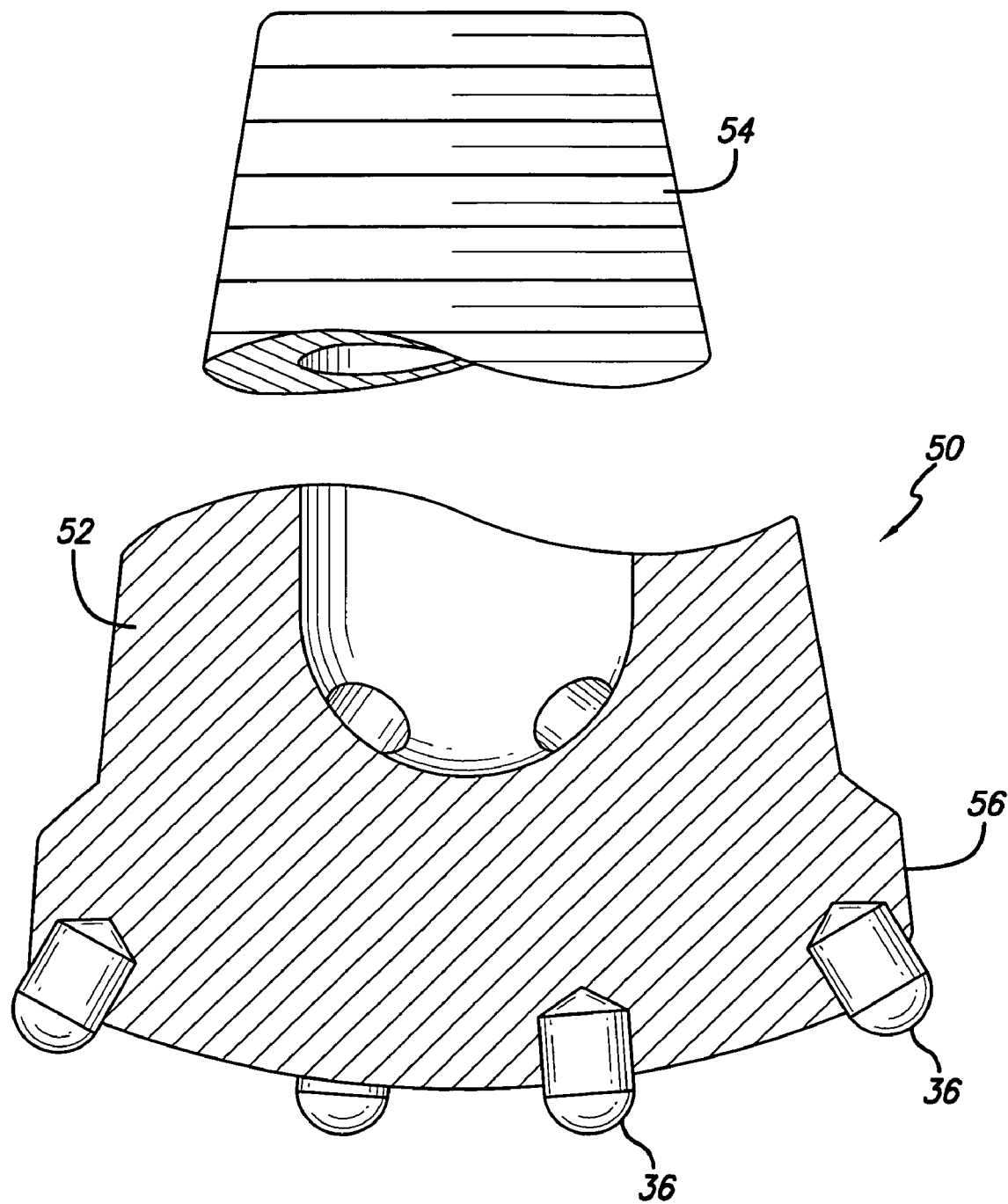
FIG. 7 is a perspective side view of a percussion or hammer bit comprising a number of inserts of FIG. 5.

Referring to FIG. 7, inserts 36 formed from thermally-stable PCD materials of this invention can also be used with a percussion or hammer bit 50, comprising a hollow steel body 52 having a threaded pin 54 on an end of the body for assembling the bit onto a drill string (not shown) for drilling oil wells and the like. A plurality of the inserts 36 are provided in the surface of a head 56 of the body 52 for bearing on the subterranean formation being drilled.

Figure 8:
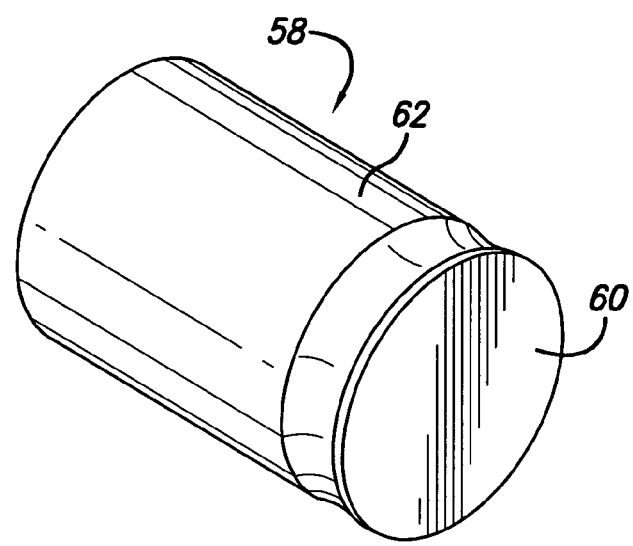
FIG. 8 is a schematic perspective side view of a polycrystalline diamond shear cutter comprising thermally-stable PCD material of this invention.

Referring to FIG. 8, thermally-stable PCD materials of this invention can also be used to form PCD shear cutters 58 that are used, for example, with a drag bit for drilling subterranean formations. More specifically, thermally-stable PCD materials of this invention can be used to form a layer of PCD 60 that is sintered or otherwise attached to a cutter substrate 62.

Figure 9:
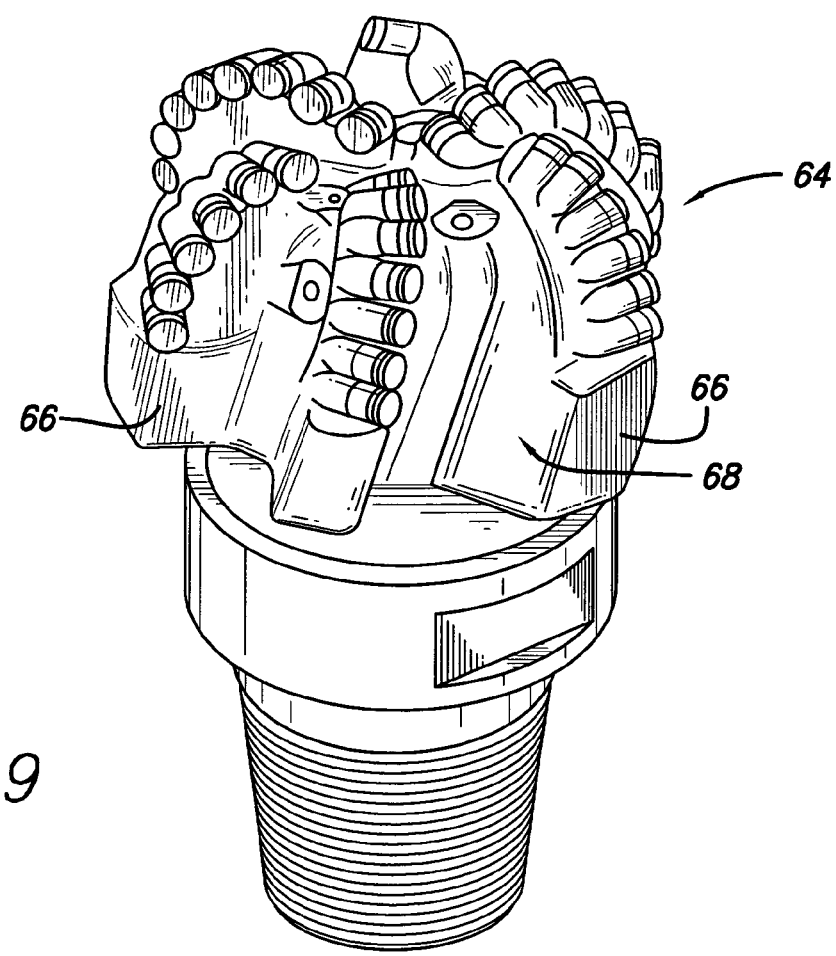
FIG. 9 is a perspective side view of a drag bit comprising a number of the shear cutters of FIG. 8.

Referring to FIG. 9, a drag bit 64 comprises a plurality of such PCD shear cutters 58 that are each attached to blades 66 that extend from a head 68 of the drag bit for cutting against the subterranean formation being drilled.

Other modifications and variations of PCD materials and PCD compacts formed therefrom will be apparent to those skilled in the art. It is, therefore, to be understood that within the scope of the appended claims, this invention may be practiced otherwise than as specifically described.

What is claimed is:

1. A polycrystalline diamond compact comprising:
   a body comprising a plurality of bonded together diamond crystals with interstitial regions disposed therebetween, the body including:
      a first region having a reaction product disposed within the interstitial regions, the reaction product comprising a combination of a diamond crystal binder/catalyst with a reactive material and having a coefficient of thermal expansion that is more closely matched to the diamond crystals than to the binder catalyst; and
      a second region having the diamond crystal binder catalyst disposed within the interstitial regions and not including the reaction product;
   a substrate attached to the body selected from the group consisting of carbides, nitrides, carbonitrides, cermet materials, and mixtures thereof.

2. The polycrystalline diamond compact as recited in claim 1 wherein the body first region is positioned along a body working surface.

3. The polycrystalline diamond compact as recited in claim 1 wherein the substrate is attached to the body second region.

4. The polycrystalline diamond compact as recited in claim 1 further comprising a barrier layer interposed between the substrate and the body.

5. The polycrystalline diamond compact as recited in claim 1 wherein the reactive material is selected from the group of materials capable of reacting with the binder/catalyst material during high pressure/high temperature process conditions used to form the bonded together diamond crystals.

6. The polycrystalline diamond compact as recited in claim 5 wherein the reactive material comprises a carbide-containing material that precipitates diamond during the high pressure/high temperature process conditions.

7. The polycrystalline diamond compact as recited in claim 1 wherein the reactive material is selected from the group consisting of silicon and silicon-containing compounds.

8. The polycrystalline diamond compact as recited in claim 7 wherein the reactive material is selected from the group consisting of Si, SiC, and mixtures thereof.

9. The polycrystalline diamond compact as recited in claim 1 wherein the first region further comprises a reaction product between the reactive material and the diamond crystals.

10. The polycrystalline diamond compact as recited in claim 4 wherein the barrier layer is selected from the group consisting of carbide forming refractory metals.

* * * * *